(12) United States Patent
Rajappa et al.

(10) Patent No.: US 12,462,928 B2
(45) Date of Patent: Nov. 4, 2025

(54) DYNAMIC HEALTHCARE SYSTEM FOR SPASMODIC CLINICAL WORKFLOWS

(71) Applicant: Ethicon, Inc., Somerville, NJ (US)

(72) Inventors: Manikandan Rajappa, North Wales, PA (US); Shantha Andrews, Lansdale, PA (US)

(73) Assignee: Ethicon, Inc., Raritan, NJ (US)

( * ) Notice: Subject to any disclaimer, the term of this patent is extended or adjusted under 35 U.S.C. 154(b) by 288 days.

(21) Appl. No.: 18/191,778

(22) Filed: Mar. 28, 2023

(65) Prior Publication Data
US 2024/0331852 A1    Oct. 3, 2024

(51) Int. Cl.
*G16H 40/20* (2018.01)
*G06F 40/205* (2020.01)
*G16H 10/60* (2018.01)

(52) U.S. Cl.
CPC ........... *G16H 40/20* (2018.01); *G06F 40/205* (2020.01); *G16H 10/60* (2018.01)

(58) Field of Classification Search
None
See application file for complete search history.

(56) References Cited

U.S. PATENT DOCUMENTS

| | | | | |
|---|---|---|---|---|
| 2008/0046292 | A1* | 2/2008 | Myers | G06F 16/283 705/3 |
| 2019/0090954 | A1* | 3/2019 | Kotian | H04N 23/90 |
| 2020/0388385 | A1* | 12/2020 | De Los Reyes | G16H 50/70 |
| 2021/0193297 | A1* | 6/2021 | Buckland | G16H 40/20 |
| 2022/0301671 | A1* | 9/2022 | Trachtman | G16H 50/20 |
| 2023/0017196 | A1* | 1/2023 | Jain | H04L 67/53 |
| 2023/0064408 | A1* | 3/2023 | Garling | G16H 50/50 |
| 2024/0299094 | A1* | 9/2024 | Roh | A61B 90/37 |

OTHER PUBLICATIONS

Dhayne et al., In Search of Big Medical Data Integration Solutions—A Comprehensive Survey, IEEE Access, Digital Object Identifier 10.1109/ACCESS.2019.2927491.*
Cotter et al., Semantic Enrichment of Streaming Healthcare Data, arXiv:1912.00423v1 [cs.IR] Dec. 1, 2019.*
Loftus et al., Ideal algorithms in healthcare: Explainable, dynamic, precise, autonomous, fair, and reproducible, PLOS Digital Health Jan. 18, 2022.*

* cited by examiner

*Primary Examiner* — David J Stoltenberg
(74) *Attorney, Agent, or Firm* — AMSEL IP LAW PLLC; Jason Amsel

(57) ABSTRACT

A healthcare system accommodates spasmodic clinical workflows for populating a records database associated with a surgical platform or other digital healthcare platform. An interoperability engine receives data streams including events from various electronic health records systems that provide data events according to varying format, order, and timing dependent on their corresponding clinical workflows. The interoperability engine maps indeterminate events to expected events associated with a clinical workflow based on a clinical workflow management file, an industry standard model, a general parsing model, or a combination thereof. The interoperability engine may furthermore detect non-compliance of received events and may generate feedback indicative of a compliance assessment.

20 Claims, 6 Drawing Sheets

DYNAMIC HEALTHCARE SYSTEM FOR SPASMODIC CLINICAL WORKFLOWS

BACKGROUND

Technical Field

The described embodiments relate to systems to facilitate interoperability of healthcare systems including by processing and accommodating spasmodic clinical workflows.

Description of the Related Art

Various electronic healthcare records (EHR) systems exist that enable healthcare providers to enter, maintain, and view digital records associated with patients, medical practitioners, facilities, procedures, and related data. Different EHR systems can implement different protocols and with respect to the ordering, content and exchange of data, thereby impacting interoperability with other EHR systems. Furthermore, even between similarly configured EHR systems, interoperability between different systems may be affected by legacy issues, differing versions, formats, and timing of content exchange. Thus, inconsistencies in clinical workflows may result in incompatibilities between EHR systems (e.g., for some a planned procedure) being erratic and/or error prone-thereby impacting interoperability, increasing manual intervention, decreasing efficiencies, and raising costs and detracting, in many ways from the advantages that EHR systems were intended to provide.

In addition, because various medical systems-such as diagnostic, therapeutic, and/or surgical systems are designed to interoperate with EHR systems to exchange data pertinent to the patient's healthcare, lower interoperability can increase the risks associated with medical procedures for patients. Obtaining and interpreting data from EHR systems is, thus, inherently challenging.

SUMMARY

A processor-implemented method processes clinical workflows associated with a surgical platform. A medical computing system receives a plurality of first data streams. At least one first data stream is associated with at least one corresponding indeterminate first clinical workflow, and the at least one corresponding indeterminate first clinical workflow comprises a corresponding first sequence of received events associated with medical procedures facilitated by the surgical platform. The corresponding first sequence of received events comprises at least one first indeterminate received event, and each received event comprises one or more corresponding first data records. The medical computing system determines, based at least in part on the one or more corresponding first data records associated with the at least one corresponding indeterminate first clinical workflow, an event correspondence between at least one known event and the at least one first indeterminate received event. The known events are associated with medical procedures facilitated by the surgical platform. The medical computing system determines, based at least in part on the event correspondence, at least one second clinical workflow corresponding to the at least one corresponding indeterminate first clinical workflow. The at least one second clinical workflow comprises at least one corresponding second sequence of events, wherein the at least one second sequence of events comprise the at least one known event. The medical computing system outputs information indicative of a compliance assessment of the first clinical workflow.

In an aspect, determining the event correspondence comprises obtaining a clinical workflow management file describing a clinical workflow associated with an originating electronic data source of the at least one first data stream, and applying the clinical workflow management file to map the at least one first indeterminate received event to the at least one known event.

In an aspect, obtaining the clinical workflow management file comprises obtaining the clinical workflow management file as a component of the at least one first indeterminate received event.

In an aspect, obtaining the clinical workflow management file comprises determining that the clinical workflow management file is absent from the at least one first indeterminate received event, detecting an identity of an originating electronic data source, and obtaining the clinical workflow management file from a data store that stores the clinical workflow management file in association with the originating electronic data source.

In an aspect, determining the event correspondence comprises determining that a clinical workflow management file is absent from the at least one first indeterminate received event and that the clinical workflow management file is absent from a clinical workflow management file data store, obtaining an industry standard model associated with an industry standard workflow from an industry standard data store, and applying the industry standard model to map the at least one first indeterminate received event to the at least one known event.

In an aspect, determining the event correspondence comprises apply a general parsing model to infer a mapping of the at least one first indeterminate received event to the at least one known event.

In an aspect, the plurality of data streams are received from a plurality of disparate electronic health record systems that utilize different clinical workflows for generating the first data streams.

In an aspect, the plurality of data streams are received from an electronic health record systems that employs at least two different clinical workflows for generating the first data streams.

In an aspect, outputting the information indicative of the compliance assessment comprises generating a recommended clinical workflow management file describing an inferred clinical workflow for an originating electronic data source of the first data stream, and outputting the recommended clinical workflow management file to the originating electronic data source.

In an aspect, the plurality of first data streams are received at a data ingestion server over a network from a plurality of electronic data sources.

In an aspect, the medical computing system furthermore stores, based on the event correspondence, the first data records to respective mapped fields of a medical procedure records store used by the surgical platform.

In another embodiment, a non-transitory computer-readable storage medium stores instructions for processing clinical workflows associated with a surgical platform. The instructions when executed by one or more processors cause the one or more processors to perform steps associated with operation of a medical computing system. The medical computing system receives a plurality of first data streams. At least one first data stream is associated with at least one corresponding indeterminate first clinical workflow, and the at least one corresponding indeterminate first clinical workflow comprises a corresponding first sequence of received events associated with medical procedures facilitated by the surgical platform. The corresponding first sequence of received events comprises at least one first indeterminate received event, and each received event comprises one or more corresponding first data records. The medical computing system determines, based at least in part on the one or more corresponding first data records associated with the at least one corresponding indeterminate first clinical workflow, an event correspondence between at least one known event and the at least one first indeterminate received event. The known events are associated with medical procedures facilitated by the surgical platform. The medical computing system determines, based at least in part on the event correspondence, at least one second clinical workflow corresponding to the at least one corresponding indeterminate first clinical workflow. The at least one second clinical workflow comprises at least one corresponding second sequence of events, wherein the at least one second sequence of events comprise the at least one known event. The medical computing system outputs information indicative of a compliance assessment of the first clinical workflow.

In another embodiment, a computer system for a surgical platform comprises one or more processors and a memory comprising instructions that configure the processor. The processor receives a plurality of first data streams. At least one first data stream is associated with at least one corresponding indeterminate first clinical workflow, and the at least one corresponding indeterminate first clinical workflow comprises a corresponding first sequence of received events associated with medical procedures facilitated by the surgical platform. The corresponding first sequence of received events comprises at least one first indeterminate received event, and each received event comprises one or more corresponding first data records. The processor determines, based at least in part on the one or more corresponding first data records associated with the at least one corresponding indeterminate first clinical workflow, an event correspondence between at least one known event and the at least one first indeterminate received event. The known events are associated with medical procedures facilitated by the surgical platform. The processor determines, based at least in part on the event correspondence, at least one second clinical workflow corresponding to the at least one corresponding indeterminate first clinical workflow. The at least one second clinical workflow comprises at least one corresponding second sequence of events, wherein the at least one second sequence of events comprise the at least one known event. The processor outputs information indicative of a compliance assessment of the first clinical workflow.

DETAILED DESCRIPTION

Figure 1:
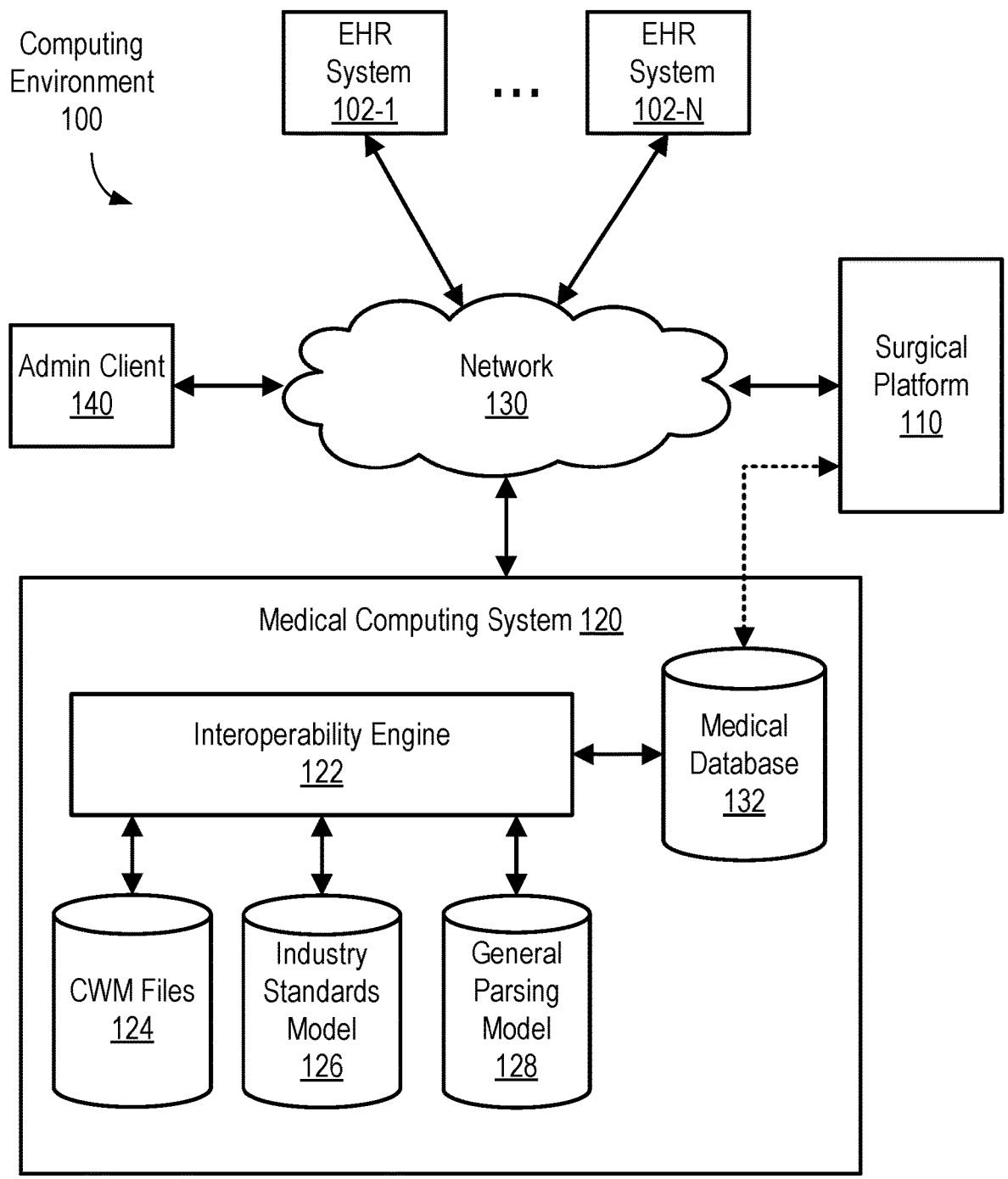
FIG. 1 is an example embodiment of a computing environment for a medical computing system that consolidates data from disparate EHR systems.

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. Wherever practicable, similar or like reference numbers may be used in the figures and may indicate similar or like elements.

Described embodiments pertain to a healthcare system to facilitate interoperability and to accommodate spasmodic clinical workflows when interacting with other systems and to enable coherent and consistent population of a records database associated with a surgical platform or other digital healthcare platform. Clinical workflows comprise a series of interrelated events in a healthcare system pertaining to exchange of data by one or more EHR systems. Each event of a workflow may include a transfer of one or more data records, which may include multiple different data fields, a single data field, or freeform (e.g., natural language) data. Spasmodic workflows may comprise event sequences that occur in short and/or irregular bursts that do not necessarily follow a pattern or structure that is easily identifiable from the events themselves. Spasmodic workflows may result from inconsistencies in the operation of different EHR systems, how they store, transmit, or receive data, and how they facilitate data exchange with other systems. In some embodiments, a workflow may comprise a sequence (e.g. an ordered sequence) of events. For example, events may include information exchange related to Facilities, Practitioner(s)/Surgeon(s), Patient(s), Appointment/Surgery schedules, Procedure(s), etc. In conventional systems, despite agreed upon protocols, changes to clinical workflows and/or erratic workflows can result in interoperability failures.

In some embodiments, the healthcare system may include a rules-based engine that may be configured to self-discover input clinical workflows and/or discrepancies associated with the clinical workflows. In some embodiments, the healthcare system may include: (a) data audit and governance capabilities to enable conformance to industry regulations and/or standards, and/or (b) flag and report inconsistencies and/or deviations from the industry regulations and/or standards, and/or (c) flag and report inconsistencies and/or deviations from published or agreed upon clinical workflows. In some embodiments, the healthcare system may include self-learning capabilities that facilitate dynamic (e.g., real-time) adaptation to clinical workflow changes and includes additional capabilities to promote clinical flow correction in other (e.g., correspondent) systems.

The healthcare system receives data streams including data events from various electronic health records systems that provide events according to varying format, order, and timing depending on their corresponding clinical workflows. The data ingestion system maps received events to expected events associated with a clinical workflow based on a clinical workflow management file, an industry standard model, a general parsing model, or a combination thereof. The healthcare system may furthermore detect non-compliance of received events and may generate feedback indicative of a compliance assessment.

FIG. 1 is an example embodiment of a computing environment 100 associated with a medical computing system 120 that promotes interoperability between a EHR systems and accommodates erratic and/or discontinuous clinical workflows. The illustrated computing environment 100 includes a network 130 that may couple a plurality of electronic health records (EHR) systems 102, an administrative client 140, a medical computing system 120, and a surgical platform 110 supported by the medical computing system 120. In other embodiments, the medical computing system 120 may support other types of digital health platforms instead of, or in addition to, the surgical platform 110 described in this example embodiment such as, for example, digital imaging platforms, diagnosis platforms, or other treatment platforms that utilize digital medical records and computing technologies to enhance medical care.

The surgical platform 110 may comprise one or more of: a set of computing devices, sensors, electronically controlled surgical tools, robotic systems, digital information systems, or other components for facilitating electronically-assisted medical procedures. The surgical platform 110 may leverage various medical imaging technologies to created detailed virtual models of a patient's anatomy and may provide real-time input (including guidance) to a medical practitioner and/or the surgical platform in association with the medical procedure. In some embodiments, the real-time input may be based, at least in part, on the clinical workflow input to medical computing system 120. The surgical platform 110 may furthermore automate (e.g., based on the real-time input) one or more aspects of the medical procedure using robotic tools or other automated systems to carry out tasks associated with a medical procedure. For example, fluoroscopic images, relevant prior medical history, etc. associated with a patient and/or medical procedure may be displayed by surgical platform 110 at appropriate points during the procedure. An example environment associated with a surgical platform 110 is described in further detail below with respect to FIG. 5.

The surgical platform 110 may interact with data stored to a medical database 132 of the medical computing system 120. The medical database 132 may store various records associated with procedures to be carried out using the surgical platform 110. These records may include information about the patient, medical histories, medical conditions, fluoroscopic images. Information about the procedure to be performed, scheduling information, information about one or more medical practitioners involved in the procedure, information about a facility where the procedure takes place, information about intervention tools used during the procedure, information about drugs to be administered during the procedure, and/or various other types of information relevant to carrying out the medical procedure. Information in the medical database 132 may be organized in a standardized format associated with the surgical platform 110. The standard may be a public standard (e.g., mandated by a standards body), a de-facto standard (e.g., agreed upon by participants), a proprietary standard (e.g., specific to a provider, practice, or facility, etc.). For example, the medical database 132 may comprise a database of records, each associated with an event, where each record may have a plurality of predefined fields that are associated with a medical procedure.

As shown in FIG. 1, the EHR systems 102-1, . . . , 102-N (collectively referenced as EHR systems 102) may comprise respective computer-based systems for capturing, storing, and managing health information. Each EHR system 102 may include a database for storing the health records, a user interface for accessing and inputting health data, and an application programming interface (API) for exchanging data with other medical data systems (e.g., between different EHR systems 102 and/or with the medical computing system 120). The patient health records stored by the EHR systems 102 may include, for example, patient identifying information, demographics, medical history, diagnostic test results, medication data, treatment plans, planned procedures, etc. The EHR systems 102 may furthermore store information relating to medical practitioners and/or medical facilities associated with patients. Each EHR system 102 may be implemented as a standalone system or as part of a larger healthcare information management system. For example, an EHR system 102 may be integrated with a computing system of a hospital, medical practitioner's office, clinic, or a network of medical providers. The EHR systems 102 may be utilized by authorized healthcare providers to enable real-time access to patient health information.

The different EHR systems 102 may comprise different EHR products (or different versions of an EHR product), and/or may be operated by different healthcare providers which may result in data flows that vary significantly in the type of content, the structure of the content, and the timing of the data flows. For example, some EHR systems 102 may use structured data formats that enforce data exchange (for at least some data fields) according to a particular standard. These standards may vary between EHR systems 102. In some instance, even when the systems subscribe to the same standard, they may have different versions. For example, one EHR system 102-i may have implemented an older version, while medical computing system 120 may have updated to a more recent version. Furthermore, some EHR systems 102-j may allow at least some types of data to be exchanged in an unstructured way.

Even where different healthcare providers utilize the same EHR product, their clinical workflows may vary significantly and result in significant discrepancies in the interoperability of EHR systems 102. Different clinical workflows may result in differences in the order in which data is exchanged between the EHR systems 102 and/or the order in which data becomes available for ingestion. For example, in the context of scheduling a procedure associated with the surgical platform, one workflow may involve an EHR system 102-i where a first event is related to the practitioner(s), a second event is related to patient(s), followed by a subsequent event related to scheduling, and then an event related to the procedure to be performed. In another instance, the clinical workflow being received an EHR system 102-j may not have a practitioner identified at the outset of the exchange and may therefore skip this step and follow a modified workflow in which the first event is patient related and a subsequent event (e.g., at a later time when available) may be practitioner related. Different clinical systems (using the same or different EHR product) may follow entirely different workflows based on internal policies, configuration constraints of the EHR system 102, the sequence in which data becomes available, etc. Further still, different instances of the same EHR system 102 may employ different workflows affecting the order of data ingestion.

Workflows may also vary because the formats of data being exchanged in connection with an event may be different. For example, in some instances, an electronic intake form for patients may be used to directly populate fields of a database of an EHR system 102, while in other instances, data may be ingested in an unstructured form (e.g., from a scan of a paper intake form).

The EHR systems 102 may facilitate interoperability via respective APIs. For example, a third-party system (such as the medical computing system 120) may use APIs to obtain one or more data streams from an EHR system 102 that includes a sequence of events associated with data records ingested into the EHR system 102. Data streams sent by an EHR system 102-*i* may differ from the expected data stream received by another EHR system 102-*j*. For example, the APIs may also affect the form and timing of the event streams they generate for EHR systems 102. Some EHR systems 102 may enable access to data via a subscription technique in which the EHR system 102 immediately pushes new data to one or more subscribers. Other EHR systems 102 may be configured to send data in batch to a requestor only upon receiving the request. Thus, the APIs of the EHR systems 102 may generate data streams following varying workflows that send sequences of events according to varying timing and format.

Further variations in clinical workflows generated by different EHR systems 102 may occur depending on whether the respective APIs of the EHR systems 102 allow for direct access to the EHR systems 102 or whether data records instead are generally shared through a third-party service. In the case of a third-party service being utilized, the third-party service may further change the format and/or timing of the events in the data streams.

In other embodiments, EHR systems 102 may exchange data without necessarily utilizing an API. For example, some EHR systems 102 may send and/or receive data in response to a request message or according to pre-arranged exchange schedule (e.g., periodic or otherwise configured).

As shown in FIG. 1, medical computing system 120 includes an interoperability engine 122 for ingesting, receiving, or importing data streams (comprising sequences of events) from the various EHR systems 102 (e.g., via their respective APIs), normalizing the data in a form suitable for use by the surgical platform 110, and storing the data to the medical database 132. Because of the differences in clinical workflows associated with different EHR systems 102, the interoperability engine 122 may include capability for handling spasmodic event flows. For example, a data stream including events associated with some procedure record in the medical database 132 may be received as a sequence of events and received at different times, potentially spread out over the course of days, weeks, months, or longer. The events of a data stream associated with the same procedure record may furthermore be received from multiple different EHR sources 102 (e.g., because the patient being treated visited multiple different providers), which may result in data being received in varying formats and varying order dependent on the clinical workflows of the different EHR systems 102. In some embodiments, the interoperability engine 122 may automatically determine correspondences between received events that may initially be indeterminate (e.g. with respect to the clinical workflow being followed) and events associated with known workflows. Once correspondence is identified, the interoperability engine 122 may associate data associated with the corresponding determined events and store the data as part of the clinical workflow associated with the surgical platform 110. For example, the interoperability engine 122 may identify when a received event corresponds to an existing record in the medical database 132 (e.g., relates to a specific planned procedure) and which step in the clinical workflow the event pertains to. In other situations, the interoperability engine 122 may identify when the event relates to start of a new clinical workflow and may map the data to a newly created record in the medical database 132. Furthermore, the interoperability engine 122 may recognize when data pertains to the same patient, medical practitioner, or medical facility even if not specifically tied to a specific planned procedure. The interoperability engine 122 may furthermore facilitate feedback to the EHR systems 102 (e.g., via the API or an external communication link) to enable improvements in accuracy and efficiency of data ingestion and promote interoperability.

In some situations, the interoperability engine 122 may operate in part by applying a clinical workflow management (CWM) file 124 to an incoming data stream and associated clinical workflow as events are received by the interoperability engine 122. The CWM file 124 may comprise a set of rules associated with a specific known clinical workflow. For example, the rules may facilitate mapping an event to one or more fields of a record in the medical database 132 based on an expected sequence of events corresponding to the associated workflow. An EHR system 102 may be associated with and/or use a corresponding CWM files 124 that conform to specific clinical workflows of the EHR system 102. CWM files 124 may be stored to a storage device of the medical computing system 120.

In an embodiment, the interoperability engine 122 may receive a CWM file 124 as a metadata component of a data stream each time an EHR system 102 communicates one or more events to the medical computing system 120. In this case, the interoperability engine 122 may apply the received CWM file 124 to the events as they are received. In other instances, the interoperability engine 122 may retrieve a preexisting or prerecorded CWM file 124 (e.g., received from the same EHR system 102 in a prior exchange) and apply the CWM file 124 to received events. Here, the interoperability engine 122 may identify the specific EHR system 102 as a source of a received event (e.g., based on the data itself, an identifier received with the data, or another identification and authentication protocol), map the identity to a specific preexisting or prerecorded CWM file 124 associated with that EHR system 102 (e.g., using a lookup table), and apply the matched CWM file 124. In an embodiment, the CWM file 124 may comprise, for example, a JavaScript Object Notation (JSON) file, other standard file format, or any other agreed upon clinical workflow exchange format.

In other instances, the interoperability engine 122 may apply an industry standards model 126 that may be stored to a storage device of the medical computing system 120. The industry standards model 126 may be associated with an industry standard workflow. In some embodiments, multiple industry standard models 126 may be stored, each corresponding to different types of EHR systems 102 (e.g., EHR systems 102 based on the same EHR product, EHR systems 102 associated with the same type of medical facility, etc.). In an embodiment, the industry standard model 126 may itself be implemented as a JSON file or other standard file format and may include a set of mapping rules similar to the CWM files 124. For example, the industry standard model 126 may be based on a sequence of events corresponding to an expected workflow.

In yet other instances, the interoperability engine 122 may instead apply a general parsing model 128 to parse incoming data events when no specific CWM file or industry standard model is applicable. The parsing model 128 may comprise a set natural language processing rules or other parsing rules to parse incoming data and map it to fields of the medical database 132. For example, natural language processing rules may be applied to unstructured natural language documents (or individual text strings) such as a freeform medical report written by a physician. Natural language processing rules may recognize terms inferred to map to certain fields such as patient name, practitioner name, condition being treated, etc. Other parsing rules may be applied to identify a repeating data structure in a data stream and parse data according to the identified structure.

In an embodiment, the medical computing system 120 and/or interoperability engine 122 may provide various feedback to the EHR system 102 in response to one or more events. The feedback may indicate compliance or non-compliance of a received event or data stream with a set of rules specified in the applied CWM file 124, industry standard model 126, and/or or parsing model 128. For example, the feedback may indicate that a required code is missing from a received event, that data is received in an unknown format, that data is duplicative or inconsistent with an existing record, or other non-compliance information. Non-compliance information may be indicative of a received event sequence differing from an expected sequence associated with an expected workflow.

The feedback may furthermore indicate which CWM file 124, industry standard model 126, and/or parsing model 128 was applied and how received data was mapped to specific fields in the medical database 132 and/or confidence levels associated with the applied mapping. In some embodiments, feedback may be limited to data that was mapped with relatively low (e.g., below a predefined threshold) confidence levels. This feedback may enable the EHR system 102 (or an administrator) to determine if the applied CWM file 124, industry standard model 126, and/or parsing model 128 was relevant to the clinical workflow actually used. Furthermore, the feedback may enable the EHR system 102 (or administrator) to determine if the specific mappings applied by the CWM file 124, industry standard model 126, and/or parsing model 128 were decided correctly or if the data should be revised and resubmitted.

In an embodiment, the feedback may comprise iterative communications between the interoperability engine 122 and the EHR system 102 to iteratively update events. For example, the interoperability engine 122 may automatically generate requests for additional data to resolve a detected ambiguity in the received data events.

In some instances, the interoperability engine 122 may generate feedback comprising specific recommendations that can be implemented at the EHR system 102 to improve compliance with the CWM file 124 or industry standard model 126. Here, the recommendation may be in the form of a specific CWM file 124 (or update to a CWM file 124) that can be supplied with future data instances. Alternatively, the recommendation may relate to different timing, format, or content of data submitted by an EHR system 102.

The surgical platform 110 may access the medical database 132 via the network 130 or via a direct connection (e.g., when the medical computing system 120 and surgical platform 110 are co-located). Data exchange between the surgical platform 110 and the medical database 132 may utilize occur via an API of the medical computing system 120 and/or may utilize various database access protocols. In some instances, all or part of medical database 132 may be resident on surgical platform 110.

The administrative client 130 may comprise, for example, a mobile phone, a tablet, a laptop or desktop computer, other computing device, or application executing thereon for accessing the medical computing system 120 via the network 130. The administrative client 130 may include a user interface (which may be a web-based interface via a browser) for viewing and/or editing medical database 132, CWM files 124, the industry standard models 126, the parsing model 128, or other control parameters associated with the medical computing system 120. The administrative client 130 may include conventional computer hardware such as a display, input device (e.g., touch screen), memory, a processor, and a non-transitory computer-readable storage medium that stores instructions for execution by the processor in order to carry out functions described herein.

The network 130 comprises communication pathways for communication between the EHR systems 102, the surgical platform 110, the medical computing system 120, and the administrative client 130. The network 140 may include one or more local area networks and/or one or more wide area networks (including the Internet). The network 130 may also include one or more direct wired or wireless connections (e.g., Ethernet, WiFi, cellular protocols, WiFi direct, Bluetooth, Universal Serial Bus (USB), or other communication link).

Figure 2:
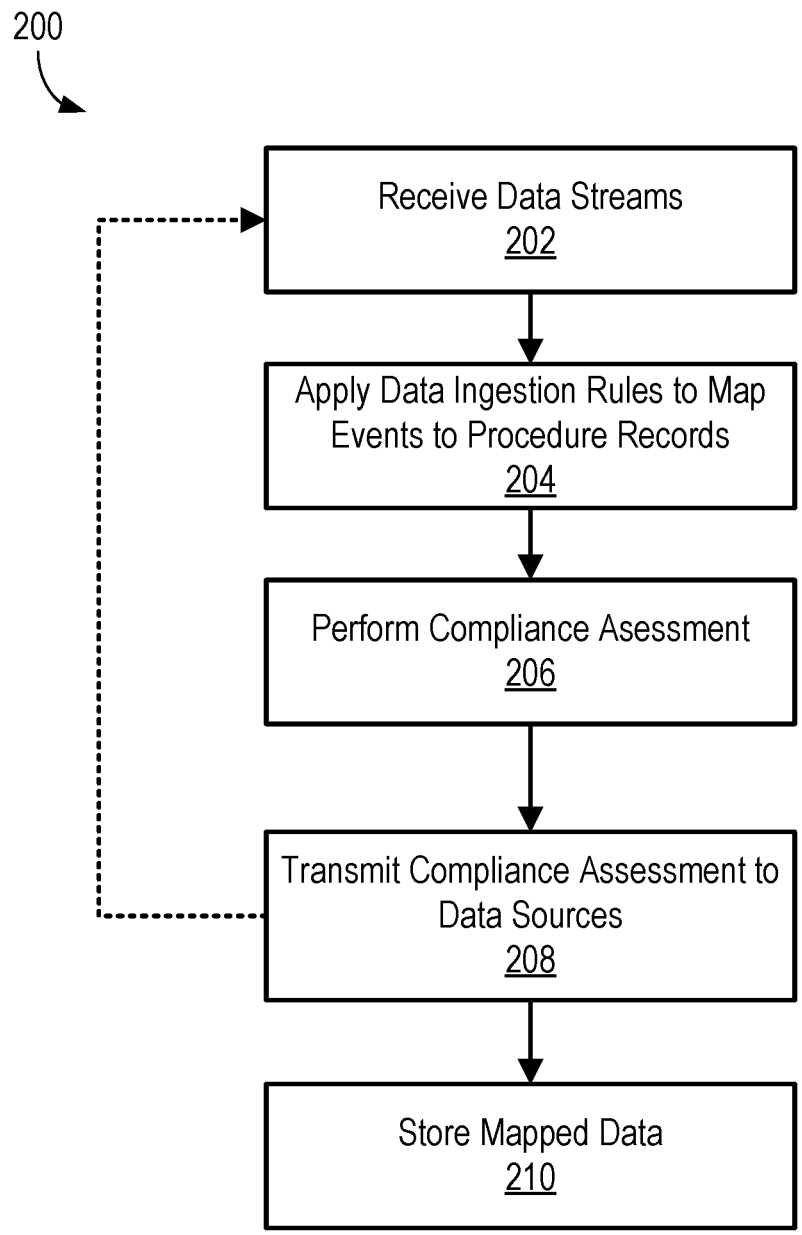
FIG. 2 is an example embodiment of a process for promoting interoperability between EHR systems that accommodates spasmodic clinical workflows.

FIG. 2 is an example embodiment of a process 200 for facilitating interoperability with a medical data system 120 that receives data streams from one or more EHR systems 102 that supply data streams based on varying and spasmodic clinical workflows. In this process, the interoperability engine 122 may receive 202 the data streams from various EHR data systems 102. The data streams (e.g., in 202) may include events that are received in various order, in varying data formats, and with varying relative timing depending on the clinical workflow being employed. The interoperability engine 122 applies 204 a set of data ingestion rules to the received events to map the events to respective fields of the medical database 132. After the mapping (e.g. in 204), data may be normalized, modified, supplemented, or otherwise adapted to conform to a standardized record format utilized by the surgical platform 110. Techniques for performing this mapping are described in further detail below with respect to FIGS. 3-4. The interoperability engine 122 furthermore performs 206 a compliance assessment associated with the received data events. Here, the compliance assessment (e.g., in 206) may determine whether or not the events comply with a set of compliance rules that may relate to the identification of events, sequence of events, structure of the data associated with the events, the content of the data, or the timing of the received data. The compliance assessment may be transmitted 208 to the EHR system 102 from which the data instance originated. In an embodiment, the compliance data (e.g., from the assessment in 208) may include a CWM file or other rules to accommodate interoperability of the EHR systems 102 and the surgery platform 110. In some cases, data may be modified and retransmitted from the EHR system 102 to the medical computing system 120 responsive to the compliance assessment data and/or in response to feedback or a request from medical computing system 120 and/or interoperability engine 122. For example, in some instances, a non-compliance alert may include a request for specific data that is absent from the event or cannot be confidently interpreted. Furthermore, the non-compliance alert may include an indication of how the interoperability engine 122 interpreted received data, which may then allow the EHR system 102 to update the transmission to correct interpretation errors. The interoperability engine 122 may store 210 the mapped data to the medical database 132.

Figure 3:
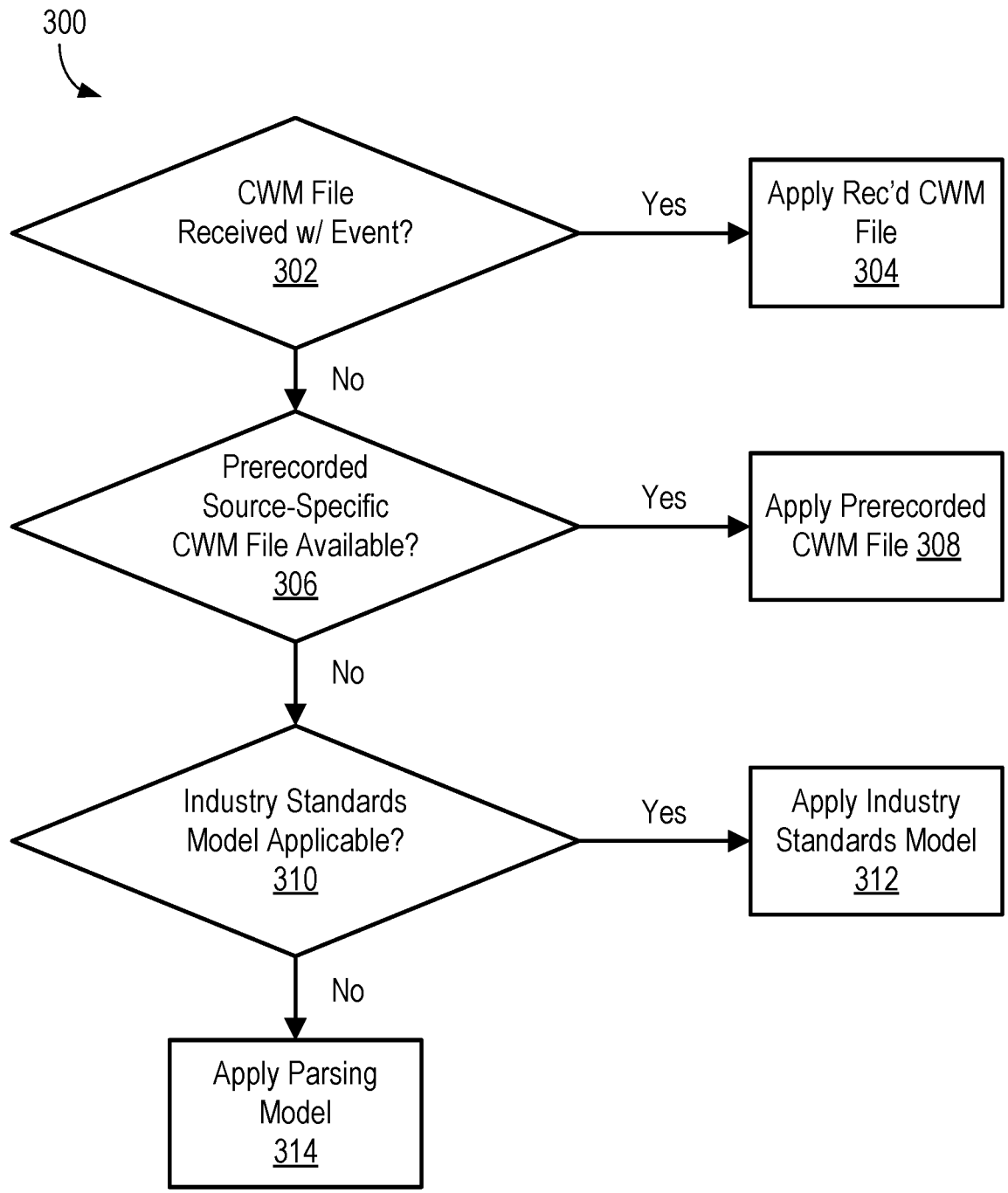
FIG. 3 is an example embodiment of a rule-based technique for facilitating EHR system interoperability under varying scenarios.

FIG. 3 is an example embodiment of a process 300 for applying a set of data ingestion rules for facilitating interoperability of EHR systems 102 with other systems such as, for example, medical computing system 120. In some embodiments, process 300 may be performed as part of steps 204 and/or 206 (FIG. 2). In this example, the interoperability engine 122 determines 302 if a CWM file is received together with the events. If the CWM file is received with the events, the interoperability engine 122 applies 304 the received CWM file to process the events. Otherwise, if the CWM file is absent from the event stream, the interoperability engine 122 determines 306 if a prerecorded source-specific CWM file is available (e.g., the CWM file store 124). Here, the interoperability engine 122 may detect an identity of the EHR system 102 that provided the event and perform a lookup in the CWM file store 124 for a matching CWM file. If the prerecorded CWM file is available, the interoperability engine 122 applies 308 the prerecorded CWM file to process events. If no prerecorded CWM file associated with the EHR system 102 is available, the interoperability engine 122 may determine 310 if an industry standard model is applicable to the events. Here, the interoperability engine 122 may automatically detect whether the received events conform to the industry standard workflow (e.g., based on the format, timing, and/or content of the data). Alternatively, the interoperability engine 122 may detect a stored association between the industry standard model and the identified EHR system 102 that indicates that the industry standard model is applicable. If the industry standard model is applicable, the interoperability engine 122 applies 312 the industry standard model to process the events. Otherwise, if no CWM file is applicable, the interoperability engine 122 may apply 314 a parsing model to parse the events and infer the mapping to one or more data fields of a procedure record. The parsing model may be developed based on various natural language processing techniques for interpreting data instances in unknown formats.

Figure 4:
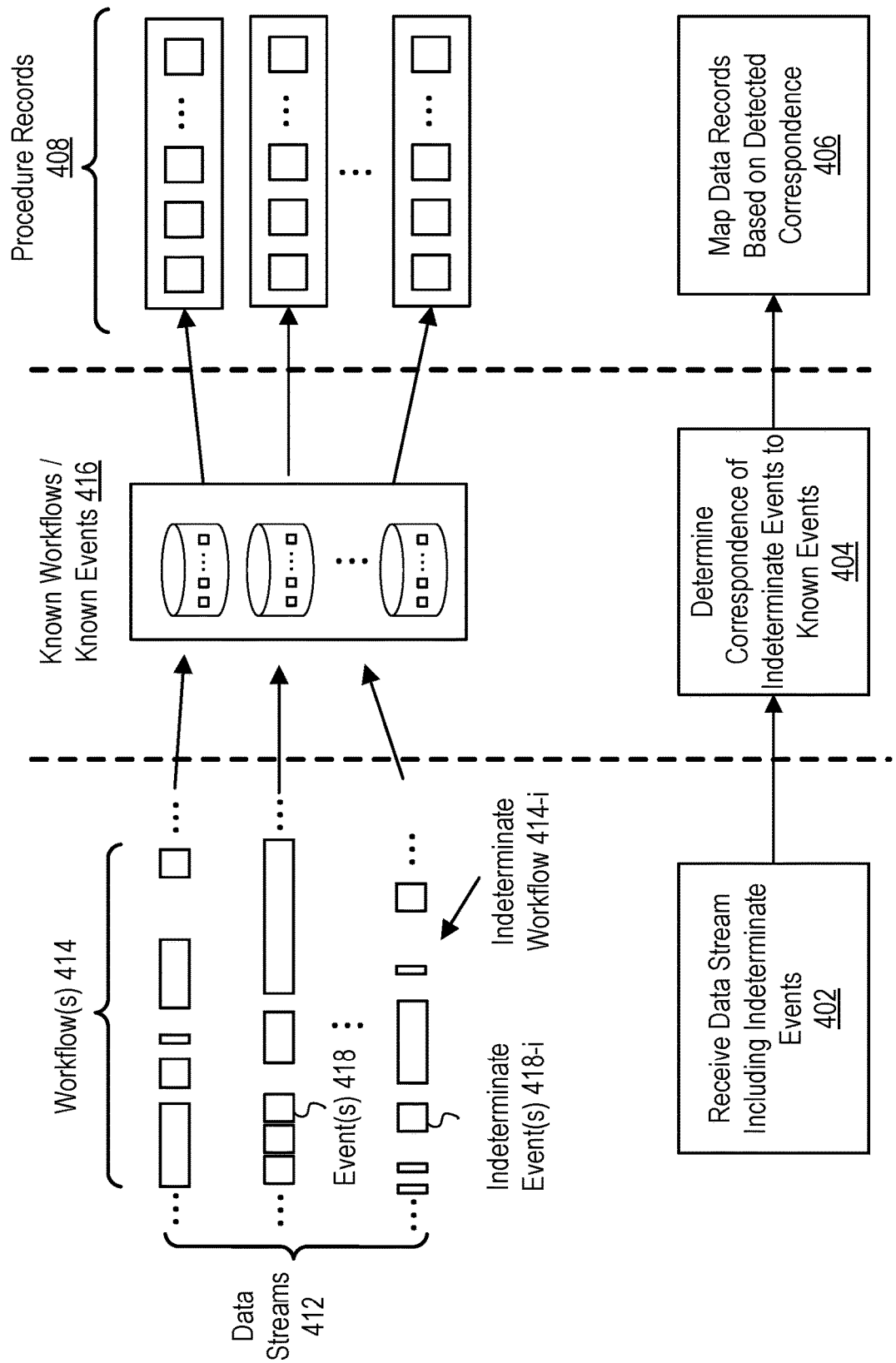
FIG. 4 is an example embodiment of a technique for determining correspondences between indeterminate events associated with a clinical workflow and known workflows for facilitating a mapping into a records database for a surgical platform.

FIG. 4 illustrates an example embodiment of a technique for determining correspondence between events 418 of one or more data streams 412 representing clinical workflows 420 and one or more known sequences of events 416 associated with known (or expected) clinical workflows for mapping the data events to medical records in a medical database 132. The interoperability engine 122 receives 402 a set of data streams 412 (where 412-$i$ refers to an individual data stream or group of data streams) comprising events 418 (where 418-$i$ refers to an individual event or group of events) representing a set of workflows 420 (wherein 420-$i$ refers to an individual workflow or group of workflows). At least one of the workflows 420 (e.g., indeterminate workflow 420-$i$) may have one or more indeterminate events 418-$i$. Each of the events 418 may comprises one or more data records. The different data streams 412 may be received from a single EHR system 102 (which may employ variable workflows at different times) or from multiple different EHR systems 102 that employ different workflows. At least some of the events 418 (e.g., event 418-$i$) in an indeterminate workflow 414-$i$ may be determined to be indeterminate upon receipt with respect to a clinical workflow they purport to follow. In other words, information in an isolated event 418-$i$ may by itself be insufficient to accurately map the data to an appropriate record field.

The interoperability engine 122 determines 404 a correspondence between events 418 (e.g., event 418-$i$) in the indeterminate workflow 414-$i$ and known events associated with a known clinical workflow 416. Here, the detected correspondence may be based on any of the techniques described in FIG. 3 (e.g., using a CWM file 124, industry standard model 126, general parsing model 128, or combination thereof). Once the mapping is obtained, the pattern of events can be mapped on the basis of the matching clinical workflow.

The interoperability engine 122 maps 406 the events 418 (e.g., event 418-$i$) of the indeterminate workflow 414-$i$ into one or more procedure records 408 in accordance with the detected correspondence. The procedure records 408 may provide a standardized set of data usable by the surgical platform 110 (or another digital health platform). The data streams 412 may furthermore represent other workflows 414 that are not necessarily indeterminate and can be directly mapped to procedure records 408.

Figure 5:
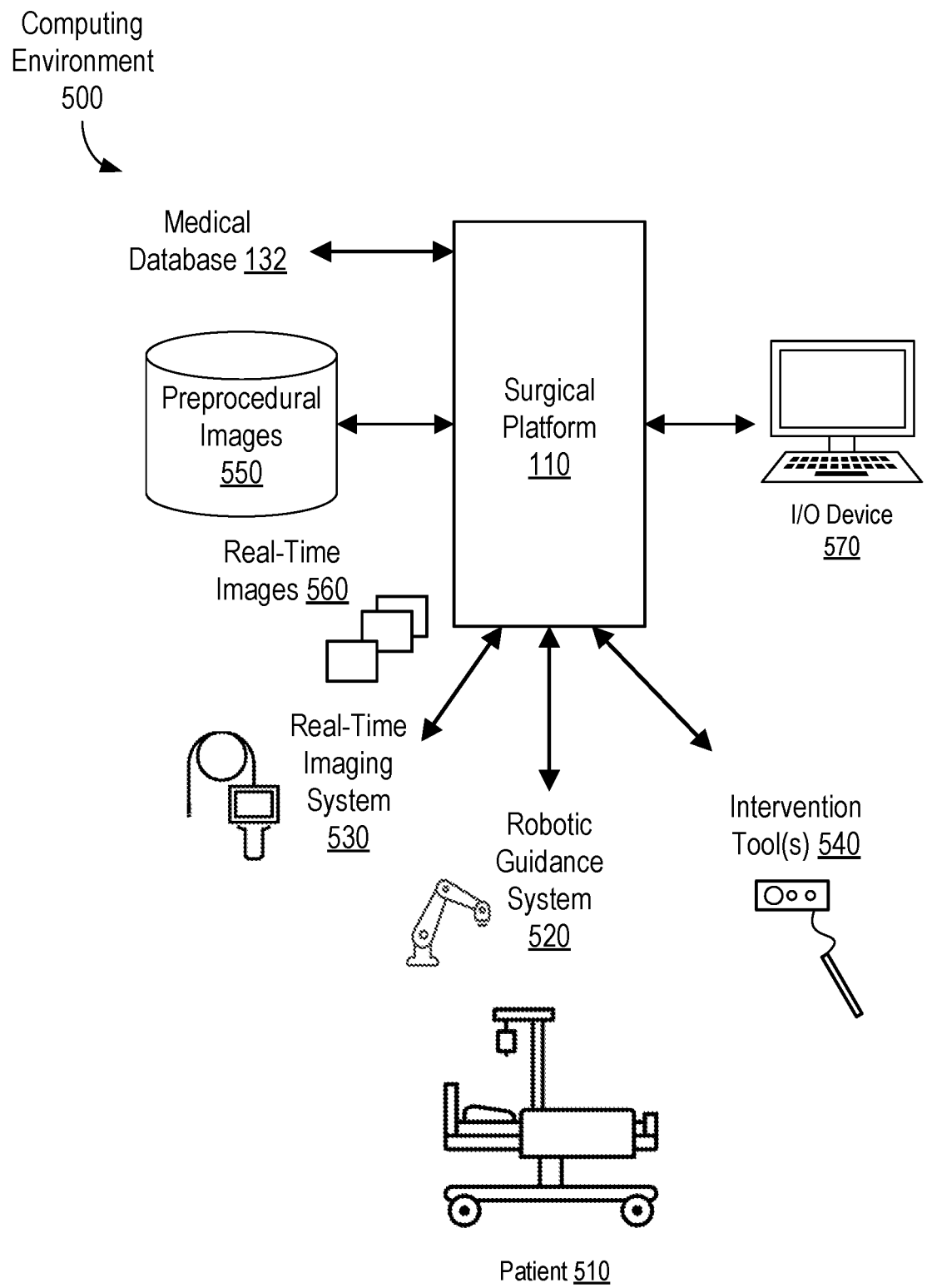
FIG. 5 is an example embodiment of a computing environment for a surgical platform to promote interoperability between EHR systems.

FIG. 5 illustrates an example computing environment 500 for a surgical platform 110 that may utilize data from the medical database 132 and/or data from received workflows (e.g., from EHR systems 102) to facilitate a digitally assisted medical procedure. The computing environment 500 includes the surgical platform 110, a robotic guidance system 520, a real-time imaging system 530 for capturing real-time images 560, a preprocedural image datastore storing preprocedural images 550, and one or more input/output (I/O) devices 170. In different variations, the computing environment 500 may include different or additional components.

The surgical platform 510 and preprocedural image datastore 550 may be all or partially co-located with the patient 510 (e.g., in an operating or examination room of a medical facility), or may be at least partially located remotely (e.g., in a server room of a medical facility or in a cloud server system remote from the medical facility). The various electronic components 520, 530, 540, 550, 570 may all or partly be communicatively coupled via one or more networks (e.g., a local area network (LAN), wide area network (WAN), cellular data network, or combination thereof), and/or may be directly communicatively coupled via wired or wireless communication links (e.g., WiFi direct, Bluetooth, Universal Serial Bus (USB), or other communication link).

The preprocedural images 550 comprise a set of images of the patient 510 captured prior to the medical procedure. The preprocedural images 550 may comprise, for example, CT scan images, magnetic resonance imaging (MRI) images, ultrasound images, X-ray images, positron emission tomography (PET) images, or other images or combinations thereof relevant to the procedure. The preprocedural images 550 may be annotated to indicate one or more target locations associated with an anatomical target (e.g., a tumor or other nodule, mass, lesion, or other anatomical structure) of the procedure. In some embodiments, one or more of the preprocedural images 550 and/or real time images 560 may also form part of a data stream 412.

In some embodiments, computing environment 500 may also include a real-time imaging system 530 that captures real-time images 560 of the patient 510 during the medical procedure. The real-time imaging system 530 may comprise an endoscope having one or more light sources and one or more light sensors (e.g., cameras) coupled to a probe tip of a long, thin, tube (e.g., rigid or flexible) that can be threaded through various anatomical channels such as airways, blood vessels, gastrointestinal tract, or other channels, or other pathways (such as through tissue) including those that may be formed by a needle, cannula, or other instrument. The real-time imaging system 530 may furthermore include one or more sensors (e.g., an electromagnetic coil) proximate to the probe tip that enables a location-sensing system to detect a location of the probe tip as it traverses through the anatomy. The probe tip of the real-time imaging system 130 may comprise a camera (e.g., single camera, stereoscopic camera, or multi-view camera) that captures images of the anatomy. The endoscope could also have one or more working channels that enable one or more instruments, such as the intervention tools 550, to pass through the endoscope to a position proximate to the camera. In some embodiments, the real time images 560 of the patient 510 during the medical procedure may be correlated with one or more of the preprocedural images 550 (e.g., to guide the procedure, to determine the efficacy of a procedure by comparing preprocedural images 550 and real-time images 560, etc.). In some embodiments, by promoting interoperability and mitigating workflow inconsistencies, computing environment processes 200 and 300 (running in medical computing system 120 or computing environment 500) may ensure timely and correct provision of information during the procedure.

The robotic guidance system 520 may facilitates movement of the real-time imaging system 530 and/or the intervention tools 540 through one or more anatomical channels or other pathways of the patient 510. The robotic guidance system 520 may comprise a robotic-assisted device that facilitates control and navigation of the real-time imaging system 530 and/or the intervention tools 540 responsive to control inputs provided by a medical professional using a I/O device 570 (e.g., a handheld controller or other computer input device). Alternatively, the robotic guidance system 520 may provide automated guidance in which it directly navigates the real-time imaging system 530 and/or the intervention tools 540 to the anatomical target without necessarily requiring manual control inputs. Here, the robotic guidance system 520 may facilitate navigation based on a predefined pathway or the robotic guidance system 520 may automatically determine the pathway. In some embodiments, real-time images 560 may be used in conjunction with preprocedural images 550 for path-planning and/or surgical guidance.

The robotic guidance system 520 may enable real-time tracking of the probe tip of the real-time imaging system 530 and/or the intervention tools 540 using electromagnetic tracking, image-based tracking (including white light and/or fluorescent light tracking), shape sensing, or other techniques. The robotic guidance system 520 may furthermore control actuation of the intervention tools 540 to facilitate various medical processes.

In different embodiments, the robotic guidance system 520 may operate with different levels of autonomy. For example, in some embodiments, the robotic guidance system 520 is entirely under control of a human operator that controls movements using the I/O device 570. In other embodiments, the robotic guidance system 520 may operate in conjunction with the surgical platform 510 to perform completely automated procedures based on the target marked in the preprocedural images 550. Other embodiments may include a combination of manually controlled and automatically controlled functions.

The surgical platform 110 performs a registration between the set of preprocedural images 550 and the real-time images 560 to map between respective coordinates of the image spaces in the preprocedural images 550 and the real-time images 560. In this way, the real-time position of the probe end of the real-time imaging system 530 can be mapped to a specific position in the image space of the preprocedural images 550. Furthermore, the target position of the anatomical target in the preprocedural images can be mapped to a virtual target location in the real-time images. A location of an intervention tool 540 may similarly be registered to the real-time images 560 and/or the preprocedural images based on predefined physical alignment between the intervention tool 540 and the probe tip of the real-time imaging system 130, electromagnetic tracking, image-based tracking, or a combination thereof.

The surgical platform 110 may furthermore determine a navigation path to a target position in the preprocedural images 550. For example, the surgical platform 110 may generate control signals for controlling navigation of the real-time imaging system 530 to a vicinity of the target. The intervention tool 540 may then be deployed to facilitate the medical procedure.

The surgical platform 110 may utilize information in the procedure records 128 populated using the techniques described above to facilitate the assisted medical procedure. For example, the procedure records 128 may directly provide information about the procedure being performed and may therefore enable configuration of the surgical platform 110 for the appropriate procedure. Information about the patient (such as height, weight, or other physical characteristics) may furthermore affect various configuration settings of the surgical platform 110. The surgical platform 110 may furthermore obtain information about one or more medical practitioners from the procedure records 128 and may automatically configured according to preferences associated with a medical practitioner operating the surgical platform.

The surgical platform 110 may be implemented using on-site computing and/or storage systems, cloud computing and/or storage systems, or a combination thereof. Accordingly, the surgical platform 110 may be local, remote, and/or distributed with portions being local and portions remote, where the various system elements may be communicatively coupled over a network. The surgical platform 110 may implement the functions described herein by one or more processor and a non-transitory computer-readable storage medium that stores instructions executable by the one or more processors to perform the described functions.

The I/O device 570 may render various views of the preprocedural images 550 and/or the real-time images 560 to facilitate the medical procedure. Various virtual objects and/or other data may optionally be overlaid on the preprocedural images 550 and/or the real-time images 560. For example, a location of the target marked in the preprocedural images and registered to the real-time images 560 may be rendered as a virtual object in a display of the real-time images 560. Furthermore, a tracked location of the probe tip of the real-time imaging system 530 and/or the intervention tool 540 may be mapped to coordinates in the preprocedural images 550 and overload on the preprocedural images 550 to track movement of the real-time imaging system 130 and/or the intervention tool 540.

In various alternative embodiments, the medical computing system 120 described above may support a different type of digital health system other than the surgical platform 110. For example, the medical computing system 120 may support medical information systems for tracking patient information, treatment plans, or other medical processes. Furthermore, the medical computing system 120 may support platforms for facilitating clinical trials, medical research, machine learning platforms that rely on healthcare data, or other digital healthcare systems.

Figure 6:
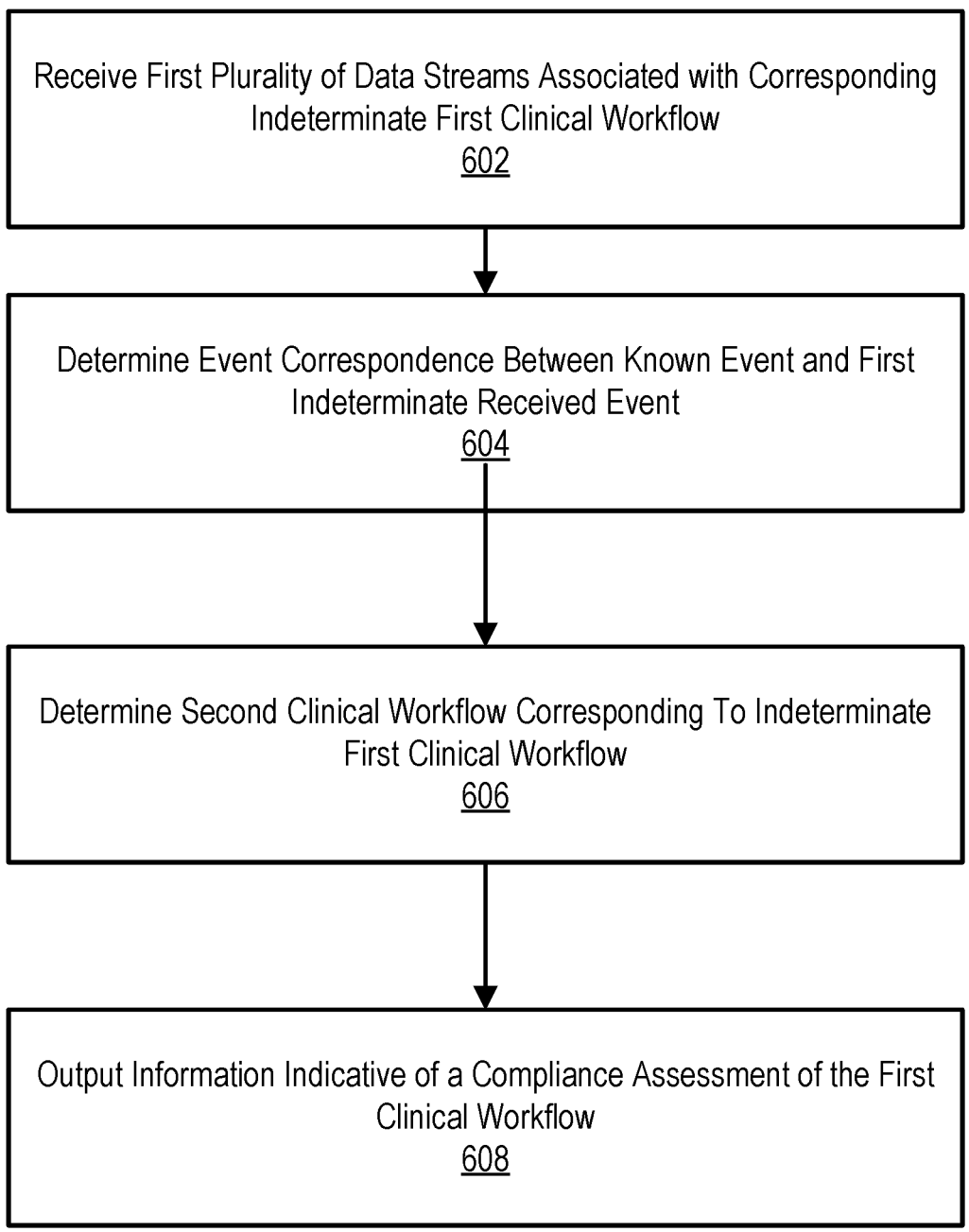
FIG. 6 is a flowchart illustrating an example embodiment of a processor-implemented method for processing clinical workflows associated with a surgical platform.

FIG. 6 is a flowchart illustrating an example embodiment of a processor-implemented method for processing clinical workflows associated with a surgical platform 110 (e.g., the surgery platform of FIG. 5 above). An interoperability engine 122 (e.g., as described in FIG. 1) receives 602 a plurality of first data streams 412. For example, as described in step 202 of FIG. 2, the data streams 412 may be received from various EHR data systems 102 and may include events 418 that are received in various order, in varying data formats, and with varying relative timing depending on the clinical workflow being employed. The data streams 412 may be received directly from the EHR data systems 102 (e.g., via respective APIs) or via third-party services. At least one first data stream 412-i may be associated with at least one corresponding indeterminate first clinical workflow 414-i. For example, the data streams 412 may represent spasmodic event flows in which related data may be received as events 418 potentially spread out over varying time windows and in varying order, events 418 that may be received from different EHR systems 102, and events 418 that may be received according to varying formatting. The at least one corresponding indeterminate first clinical workflow comprises a corresponding first sequence of received events 418 associated with medical procedures facilitated by the surgical platform 110. The corresponding first sequence of received events 418 comprises at least one first indeterminate received event 418-i, and each received event 418 comprises one or more corresponding first data records. In an embodiment, the plurality of data streams are received over a network 130 from a plurality of disparate EHR system 102 that utilize different clinical workflows for generating the first data streams.

The interoperability engine 122 determines 604, based at least in part on the one or more corresponding first data records associated with the at least one corresponding indeterminate first clinical workflow 414-i, an event correspondence between at least one known event and the at least one first indeterminate received event 418-i. The known events may be associated with medical procedures facilitated by the surgical platform 110. For example, as described in FIG. 2, the interoperability engine may apply 204 a set of data ingestion rules to the received events 218 to map the events to respective fields of the medical database 132 associated with known events.

Determining 604 the event correspondence may utilize any of the techniques described above with respect to FIG. 3. For example, in some instances, determining 604 the event correspondence may comprise, for example, obtaining a CWM file 124 describing a clinical workflow associated with an originating electronic data source of the at least one first data stream 412-i, and applying the CWM file 124 to map the at least one first indeterminate received event 418-i to the at least one known event. The CWM file 124 may be obtained as a component of the at least one first indeterminate received event 418-i (e.g., as described in steps 302, 304 of FIG. 3).

If the CWM file 124 is absent from the data stream, the interoperability engine 122 may employ one or more alternative techniques to process the data stream. For example, in some instances, the interoperability engine 122 may determine that the CWM file 124 is absent from the at least one first indeterminate received event 418-i, detect an identity of an originating electronic data source (e.g., an EHR system 102), and obtain the CWM file 124 from a data store that stores the CWM file 124 in association with the originating electronic data source (e.g., as described in steps 306, 308 of FIG. 3). In other instances, the interoperability engine 122 may obtain an industry standard model 126 associated with an industry standard workflow and apply the industry standard model 126 to map the at least one first indeterminate received event 418-i to the at least one known event (e.g., as described in steps 310, 312 of FIG. 3). In yet other instances, the interoperability engine 122 may apply a general parsing model (e.g., based on natural language processing) to infer a mapping of the at least one first indeterminate received event 418-i to the at least one known event (e.g., as described in step 314 of FIG. 3).

The interoperability engine 122 determines 606, based at least in part on the event correspondence, at least one second clinical workflow corresponding to the at least one corresponding indeterminate first clinical workflow 414-i. The at least one second clinical workflow may comprise at least one corresponding second sequence of events and the at least one second sequence of events may comprise the at least one known event.

The interoperability engine 122 outputs 608 information indicative of a compliance assessment of the first clinical workflow. For example, as described above with respect to FIG. 2 (steps 206, 208), the interoperability engine 122 may generate a recommended CWM file 124 describing an inferred clinical workflow for an originating electronic data source of the first data stream and output the recommended clinical workflow management file to the originating electronic data source. In other instances, the interoperability engine 122 may generate a non-compliance alert, which may optionally include a request for information deemed missing from the received events 218.

Embodiments of the described computing environment 100 and corresponding processes may be implemented by one or more computing systems. The one or more computing systems include at least one processor and a non-transitory computer-readable storage medium storing instructions executable by the at least one processor for carrying out the processes and functions described herein. The computing system may include distributed network-based computing systems in which functions described herein are not necessarily executed on a single physical device. For example, some implementations may utilize cloud processing and storage technologies, virtual machines, or other technologies.

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible non-transitory computer readable storage medium or any type of media suitable for storing electronic instructions and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope is not limited by this detailed description, but rather by any claims that issue on an application based hereon. Accordingly, the disclosure of the embodiments is intended to be illustrative, but not limiting, of the scope of the invention, which is set forth in the following claims.

The invention claimed is:

1. A processor-implemented method for processing clinical workflows associated with a surgical platform, the method comprising:
   receiving, over a network, a plurality of first data streams from two or more different electronic health record systems via respective application programming interfaces that differ in timing or format of their data transmissions, wherein at least one first data stream is associated with at least one corresponding indeterminate first clinical workflow, wherein the at least one corresponding indeterminate first clinical workflow comprises a corresponding first sequence of received events associated with medical procedures facilitated by the surgical platform, wherein the corresponding first sequence of received events comprises at least one first indeterminate received event, and each received event comprises one or more corresponding first data records;
   determining, based at least in part on the one or more corresponding first data records associated with the at least one corresponding indeterminate first clinical workflow, an event correspondence between at least one known event and the at least one first indeterminate received event, wherein the known events are associated with medical procedures facilitated by the surgical platform;
   determining, based at least in part on the event correspondence, at least one second clinical workflow corresponding to the at least one corresponding indeterminate first clinical workflow, wherein the at least one second clinical workflow comprises at least one corresponding second sequence of events, wherein the at least one second sequence of events comprise the at least one known event;
   outputting, over the network via the one or more application programming interfaces to one or more of the electronic health record systems, information indicative of a compliance assessment of the first clinical workflow relative to the second clinical workflow that causes the one or more electronic health record systems to update the timing or format of the data transmissions to increase compliance; and
   storing information from the plurality of data streams to a medical database.

2. The method of claim 1, wherein determining the event correspondence comprises:
   obtaining a clinical workflow management file describing a clinical workflow associated with an originating electronic data source of the at least one first data stream; and
   applying the clinical workflow management file to map the at least one first indeterminate received event to the at least one known event.

3. The method of claim 2, wherein obtaining the clinical workflow management file comprises:
   obtaining the clinical workflow management file as a component of the at least one first indeterminate received event.

4. The method of claim 2, wherein obtaining the clinical workflow management file comprises:
   determining that the clinical workflow management file is absent from the at least one first indeterminate received event;
   detecting an identity of an originating electronic data source; and
   obtaining the clinical workflow management file from a data store that stores the clinical workflow management file in association with the originating electronic data source.

5. The method of claim 1, wherein determining the event correspondence comprises:
   determining that a clinical workflow management file is absent from the at least one first indeterminate received event and that the clinical workflow management file is absent from a clinical workflow management file data store;
   obtaining an industry standard model associated with an industry standard workflow from an industry standard data store; and
   applying the industry standard model to map the at least one first indeterminate received event to the at least one known event.

6. The method of claim 1, wherein determining the event correspondence comprises:
   apply a general parsing model to infer a mapping of the at least one first indeterminate received event to the at least one known event.

7. The method of claim 1, wherein a subset of the plurality of first data streams are received from an electronic health record system that employs at least two different clinical workflows for generating the subset of the plurality of first data streams.

8. The method of claim 1, wherein outputting the information indicative of the compliance assessment further comprises:
   generating a recommended clinical workflow management file describing an inferred clinical workflow for an originating electronic data source of the first data stream; and
   outputting the recommended clinical workflow management file to the originating electronic data source.

9. The processor-implemented method of claim 1, wherein storing the information to the medical database comprises:
   storing, based on the event correspondence, the first data records to respective mapped fields of a medical procedure records store used by the surgical platform.

10. A non-transitory computer-readable storage medium storing instructions for processing clinical workflows associated with a surgical platform, the instructions when executed by one or more processors causing the one or more processors to perform steps comprising:

receiving, over a network, a plurality of first data streams from two or more different electronic health record systems via respective application programming interfaces that differ in timing or format of their data transmissions, wherein at least one first data stream is associated with at least one corresponding indeterminate first clinical workflow, wherein the at least one corresponding indeterminate first clinical workflow comprises a corresponding first sequence of received events associated with medical procedures facilitated by the surgical platform, wherein the corresponding first sequence of received events comprises at least one first indeterminate received event, and each received event comprises one or more corresponding first data records;

determining, based at least in part on the one or more corresponding first data records associated with the at least one corresponding indeterminate first clinical workflow, an event correspondence between at least one known event and the at least one first indeterminate received event, wherein the known events are associated with medical procedures facilitated by the surgical platform;

determining, based at least in part on the event correspondence, at least one second clinical workflow corresponding to the at least one corresponding indeterminate first clinical workflow, wherein the at least one second clinical workflow comprises at least one corresponding second sequence of events, wherein the at least one second sequence of events comprise the at least one known event;

outputting, over the network via the one or more application programming interfaces to one or more of the electronic health record systems, information indicative of a compliance assessment of the first clinical workflow relative to the second clinical workflow that causes the one or more electronic health record systems to update the timing or format of the data transmissions to increase compliance; and storing information from the plurality of data streams to a medical database.

11. The non-transitory computer-readable storage medium of claim 10, wherein determining the event correspondence comprises:
obtaining a clinical workflow management file describing a clinical workflow associated with an originating electronic data source of the at least one first data stream; and
applying the clinical workflow management file to map the at least one first indeterminate received event to the at least one known event.

12. The non-transitory computer-readable storage medium of claim 11, wherein obtaining the clinical workflow management file comprises:
obtaining the clinical workflow management file as a component of the at least one first indeterminate received event.

13. The non-transitory computer-readable storage medium of claim 11, wherein obtaining the clinical workflow management file comprises:
determining that the clinical workflow management file is absent from the at least one first indeterminate received event;
detecting an identity of an originating electronic data source; and
obtaining the clinical workflow management file from a data store that stores the clinical workflow management file in association with the originating electronic data source.

14. The non-transitory computer-readable storage medium of claim 10, wherein determining the event correspondence comprises:
determining that a clinical workflow management file is absent from the at least one first indeterminate received event and that the clinical workflow management file is absent from a clinical workflow management file data store;
obtaining an industry standard model associated with an industry standard workflow from an industry standard data store; and
applying the industry standard model to map the at least one first indeterminate received event to the at least one known event.

15. The non-transitory computer-readable storage medium of claim 10, wherein determining the event correspondence comprises:
apply a general parsing model to infer a mapping of the at least one first indeterminate received event to the at least one known event.

16. The non-transitory computer-readable storage medium of claim 10, wherein a subset of the plurality of first data streams are received from an electronic health record system that employs at least two different clinical workflows for generating the subset of the plurality of first data streams.

17. A computer system for a surgical platform, comprising:
one or more processors; and
a memory comprising instructions to configure the processor to:
receive, over a network, a plurality of first data streams from two or more different electronic health record systems via respective application programming interfaces that differ in timing or format of their data transmissions, wherein at least one first data stream is associated with at least one corresponding indeterminate first clinical workflow, wherein the at least one corresponding indeterminate first clinical workflow comprises a corresponding first sequence of received events associated with medical procedures facilitated by the surgical platform, wherein the corresponding first sequence of received events comprises at least one first indeterminate received event, and each received event comprises one or more corresponding first data records;
determine, based at least in part on the one or more corresponding first data records associated with the at least one corresponding indeterminate first clinical workflow, an event correspondence between at least one known event and the at least one first indeterminate received event, wherein the known events are associated with medical procedures facilitated by the surgical platform;
determine, based at least in part on the event correspondence, at least one second clinical workflow corresponding to the at least one corresponding indeterminate first clinical workflow, wherein the at least one second clinical workflow comprises at least one corresponding second sequence of events, wherein the at least one second sequence of events comprise the at least one known event;
output, over the network via the one or more application programming interfaces to one or more of the electronic health record systems, information indicative of a compliance assessment of the first clinical workflow relative to the second clinical workflow that causes the one or more electronic health record systems to update the timing or format of the data transmissions to increase compliance; and store information from the plurality of data streams to a medical database.

18. The method of claim 1, further comprising:

automatically configuring, using the information stored to the medical database, one or more medical tools of the surgical platform for performance of a medical procedure.

19. The non-transitory computer-readable storage medium of claim 10, wherein the instructions when executed further cause the one or more processors to perform steps comprising:

automatically configuring, using the information stored to the medical database, one or more medical tools of the surgical platform for performance of a medical procedure.

20. The computer system of claim 17, wherein the instructions further configure the processor to automatically configure, using the information stored to the medical database, one or more medical tools of the surgical platform for performance of a medical procedure.

* * * * *